(12) United States Patent
Li et al.

(10) Patent No.: US 9,867,153 B2
(45) Date of Patent: Jan. 9, 2018

(54) DISTRIBUTED SYNCHRONIZATION OF IOE DEVICES

(71) Applicant: QUALCOMM Incorporated, San Diego, CA (US)

(72) Inventors: Junyi Li, Chester, NJ (US); Jay Rodney Walton, Carlisle, MS (US); Thomas Joseph Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 259 days.

(21) Appl. No.: 14/866,729

(22) Filed: Sep. 25, 2015

(65) Prior Publication Data

US 2016/0183205 A1 Jun. 23, 2016

Related U.S. Application Data

(60) Provisional application No. 62/093,945, filed on Dec. 18, 2014.

(51) Int. Cl.
*H04W 56/00* (2009.01)
*H04W 8/00* (2009.01)
*H04W 84/18* (2009.01)

(52) U.S. Cl.
CPC ......... *H04W 56/001* (2013.01); *H04W 8/005* (2013.01); *H04W 84/18* (2013.01); *Y02B 60/50* (2013.01)

(58) Field of Classification Search
CPC ......... H04W 56/001–56/0025; H04W 48/005; H04W 4/005; H04W 4/006
See application file for complete search history.

(56) References Cited

U.S. PATENT DOCUMENTS 8,358,642 B1 1/2013 Chhabra
8,483,196 B2 7/2013 Wang et al.
(Continued)

OTHER PUBLICATIONS

Intel Corporation: "Analysis of D2D Multi-Hop Synchronization Procedure", 3GPP TSG RAN WG1 Meeting #78bis; R1-143762, 3rd Generation Partnership Project (3GPP), Mobile Competence Centre ; 650, Route Des Lucioles ; F-06921 Sophiaantipolis Cedex; France, vol. RAN WG1, no. Ljubljana, Slovenia; 20141006-20141010, Oct. 5, 2014 (Oct. 5, 2014), XP050875083, 7 pages. Retrieved from the Internet: URL: http://www.3gpp.org/ftp/Meetings_3GPP_SYNC/RAN1/Docs/ [retrieved on Oct. 5, 2014].
(Continued)

*Primary Examiner* — Paul H Masur
(74) *Attorney, Agent, or Firm* — Haynes and Boone, LLP

(57) ABSTRACT

This application relates to wireless communication systems, and more particularly to distributed synchronization of "internet of everything" (IoE) devices to a common timing through opportunistic synchronization with user equipment (UE). Multiple IoE devices within proximity to each other establish device to device (D2D) links. When an IoE device receives an updated timing synchronization signal from a UE, the IoE device can broadcast the updated timing synchronization signal to other IoE devices directly or via a multi-hop forwarding scheme via the D2D links. Multiple groups of IoE devices can be synchronized to the same timing synchronization signal such that if and when IoE devices from the different groups come into proximity, the IoE devices will find each other and can merge into a larger group of synchronized IoE devices with minimal searching overhead and, therefore, minimal power consumption.

26 Claims, 9 Drawing Sheets

(56) References Cited

U.S. PATENT DOCUMENTS

| | | |
|---|---|---|
| 8,923,226 B2 | 12/2014 | Tavildar et al. |
| 8,942,201 B1 | 1/2015 | Duvvuri et al. |
| 2014/0293992 A1 | 10/2014 | Abraham et al. |
| 2014/0328329 A1 | 11/2014 | Novlan et al. |
| 2014/0335853 A1* | 11/2014 | Sartori ............... H04W 76/023 455/426.1 |
| 2015/0264588 A1* | 9/2015 | Li ..................... H04W 56/0015 370/350 |
| 2016/0044620 A1* | 2/2016 | Bagheri ............... H04W 24/10 370/252 |
| 2016/0128009 A1* | 5/2016 | Yoon .................... H04W 4/005 370/350 |
| 2016/0142991 A1* | 5/2016 | Classon ............. H04W 56/001 370/350 |
| 2016/0227496 A1* | 8/2016 | Panteleev ......... H04W 36/0055 |
| 2016/0345279 A1* | 11/2016 | Gunnarsson .......... H04W 4/005 |
| 2017/0006563 A1* | 1/2017 | Lindoff ............... H04W 56/001 |
| 2017/0142678 A1* | 5/2017 | Yoon ................. H04W 56/0015 |
| 2017/0245229 A1* | 8/2017 | Seo ..................... H04W 56/001 |

OTHER PUBLICATIONS

International Search Report and Written Opinion—PCT/US2015/063446—ISA/EPO—Mar. 11, 2016.

NEC, "D2D Synchronization Procedure for Out-of-Network Coverage", 3GPP TSG RAN WG1 Meeting #79; R1-144858; 3rd Generation Partnership Project (3GPP), Mobile Competence Centre ; 650, Route Des Lucioles ; F-06921 Sophiaantipolis Cedex ; France, vol. RAN WG1, no. San Francisco, USA; Nov. 17, 2014-Nov. 21, 2014, Nov. 17, 2014 (Nov. 17, 2014), XP050875920, 4 Pages. Retrieved from the Internet: URL: http://www.3gpp.org/ftp/Meetings_3GPP_SYNC/RAN1/Docs/ [retrieved on Nov. 17, 2014].

\* cited by examiner

DISTRIBUTED SYNCHRONIZATION OF IOE DEVICES

CROSS-REFERENCE TO RELATED APPLICATIONS

The present application claims the benefit of U.S. Provisional Patent Application No. 62/093,945, filed Dec. 18, 2014, and entitled "Distributed Synchronization of IOE Devices," the disclosure of which is incorporated by reference herein in its entirety.

TECHNICAL FIELD

This application relates to wireless communication systems, and more particularly to distributed synchronization of "internet of everything" (IoE) devices to a common timing through opportunistic synchronization with user equipment (UE).

BACKGROUND

Sensors that can link to other sensors and computer systems continue to be embedded with more and more devices or objects, resulting in the "internet of everything" (also referred to as the "internet of things"), using a variety of wired and/or wireless communication technologies. The growth in connectivity results in machine-to-machine (M2M) or device-to-device (D2D) communications without the need for human intervention. Some examples of integration include devices that integrate sensors or meters to capture information that is then relayed to a remote system, such as a central server. This can include smart metering, temperature monitoring, pressure monitoring, fluid flow monitoring, inventory monitoring, water level monitoring, equipment monitoring, healthcare monitoring, wildlife monitoring, weather and geological event monitoring, fleet management and tracking, remote security sensing, physical access control, transaction-based business charging, and other applications.

Given their nature, these IoE devices are typically designed to consume low amounts of power and have low cost. For example, a sensor deployed in a gas meter (resulting in a "smart meter") may be expected to last years without replacement or recharge (if recharging is possible). In contrast, a UE, such as a mobile device, has significantly more transmit power that, together with other features of the given UE, consume enough power that the UE is expected to be recharged every few days, if not daily or more frequently.

IoE devices are designed to periodically wake up to deliver their data to a central server or other device(s). In various media access control (MAC) protocols, it is desirable to have the IoE devices in a particular geographic area be time synchronized. In this regard, it is easier to establish mesh routing and efficient MAC scheduling among synchronized IoE devices than among asynchronous IoE devices. As a result, there is a need for techniques to improve the synchronization of IoE devices that also limit the amount of IoE device power required.

SUMMARY

In an aspect of the disclosure, a method for communicating with a wireless network includes discovering, by an internet of everything (IoE) device, a first wireless communication device; receiving, at the IoE device, an updated timing synchronization signal from the first wireless communication device after discovering the first wireless communication device; communicating the updated timing synchronization signal to at least one other IoE device; and synchronizing timing with the at least one other IoE device based on the updated timing synchronization signal.

In an additional aspect of the disclosure, an internet of everything (IoE) device includes a sensor configured to generate data from a detected event; a transceiver configured to: discover a first wireless communication device; receive an updated timing synchronization signal from the first wireless communication device after the discovery; and communicate the updated timing synchronization signal to at least one other IoE device; and a processor configured to synchronize timing with the at least one other IoE device based on the updated timing synchronization signal.

In an additional aspect of the disclosure, a method for communicating with a wireless network includes discovering, by the user equipment (UE), an internet of everything (IoE) device of a first group of synchronized IoE devices; and transmitting, from the UE, an updated timing synchronization signal to the IoE device, wherein a synchronization timing of the first group of synchronized IoE devices can be updated based on the updated timing synchronization signal.

In an additional aspect of the disclosure, a user equipment (UE) for communicating with a wireless network includes a processor configured to generate an updated timing synchronization signal; and a transceiver configured to discover a first internet of everything (IoE) device of a first group of synchronized IoE devices; and transmit the updated timing synchronization signal to the first IoE device, wherein a synchronization timing of the first group of synchronized IoE devices can be updated based on the updated timing synchronization signal.

DETAILED DESCRIPTION

Figure 1:
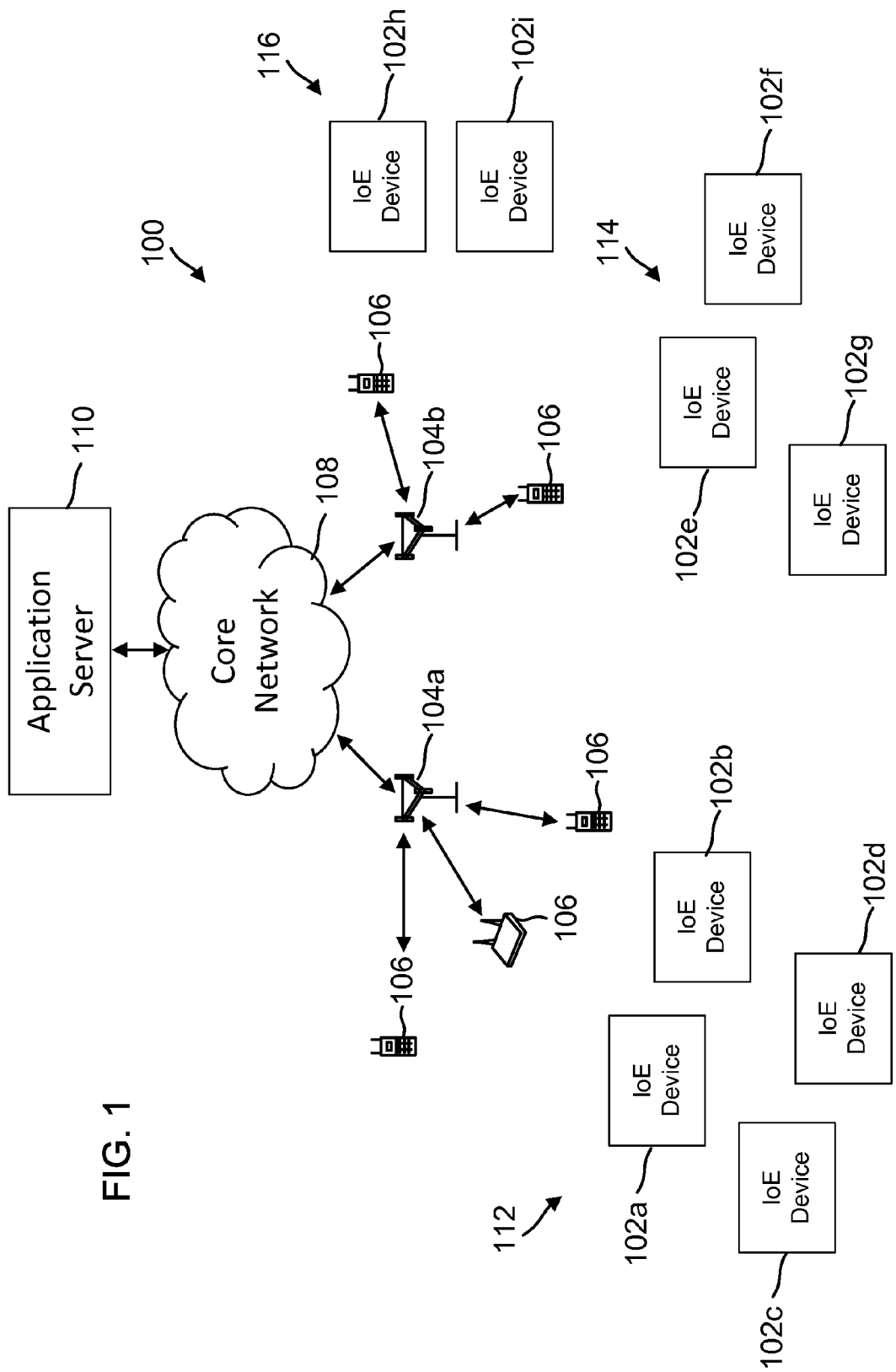
FIG. 1 is a diagram of an exemplary wireless communications environment according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G)) network. Further, devices may also communicate with one another using various peer-to-peer technologies such as LTE-Direct (LTE-D), Bluetooth, Bluetooth Low Energy (BLE), ZigBee, radiofrequency identification (RFID), and/or other ad-hoc or mesh network technologies.

Embodiments of the present disclosure introduce systems and techniques to enhance internet of everything (IoE) device synchronization. IoE devices in sufficient vicinity to each other may establish device-to-device (D2D) links with each other. In doing so, the IoE devices may communicate updated synchronization timing instructions via the D2D links. For this purpose, each IoE device can be configured to broadcast or re-broadcast synchronization timing instructions in a multi-hop manner to other IoE devices. The broadcasting scheme can be based on flooding or it may adhere to a routing scheme that a group of IoE devices may have established over time due to a listening and learning procedure, for instance.

The multi-hop forwarding scheme of an updated synchronization timing can be initiated once at least one IoE device determines that the updated synchronization timing should be implemented. The IoE device may receive a synchronization timing signal from a wireless communication device, such as a user equipment (UE) or base station, as part of a beacon from the wireless communication device or in response to a specific request to the wireless communication device for the synchronization timing signal. The IoE device may determine that an updated synchronization timing should be implemented by comparing the synchronization timing signal received from the wireless communication device to an existing synchronization timing to see which has a higher timing priority rank. For example, the IoE device or another device in communication with the IoE device, such as another IoE device, a UE, or a base station, may look up the synchronization timings in a lookup table to determine which has the higher rank. If the existing synchronization timing has a higher timing priority rank, then the existing synchronization will be maintained. On the other hand, if the synchronization timing associated with the synchronization timing signal received from the wireless communication device has a higher timing priority rank, then the synchronization timing will be updated accordingly. Generally, synchronization timings having greater global applicability (e.g., Global Positioning System (GPS) timing, base station timing, etc.) may be preferred over synchronization timings having more local applicability (e.g., UE specific timing, IoE specific timing, etc.). However, it is understood that the priority ranking of the synchronization timings for a particular IoE device or group of IoE devices can take into account many factors that may result in a local synchronization timing being preferred in some instances. As one example, a synchronization timing ranking may be as follows, in decreasing order of preference, GPS, eNB, UE, WAN relay, WLAN, and sensor node.

In this manner, the synchronization timing of an entire group of IoE devices can be updated in response to a single IoE device from the group being in communication with a wireless communication device, such as a UE or base station. This approach can also be utilized to synchronize multiple groups of IoE devices to the same synchronization timing. For example, as a UE moves within a cell or across multiple cells of a wireless network the UE will come into contact with one or more IoE devices from different groups of IoE devices. Based on the communications between the IoE devices and the UE, each of the groups of IoE devices can be synchronized to the same UE or global synchronization timing signal. This individual opportunistic synchronization of each group of IoE devices can cause multiple groups of IoE devices to all be synchronized to the same timing signal. As a result, if and when one or more IoE devices from one group comes into proximity of one or more IoE devices from another group, the IoE devices will discover each other due to the common synchronization timing and can merge into a larger group of synchronized IoE devices in D2D communication. Notably, this synchronized timing within individual IoE device groups and across multiple IoE device groups can continue long after the initial communication with the wireless communication device (UE or base station) ceases.

FIG. 1 is a diagram of an exemplary wireless communications environment 100 according to embodiments of the present disclosure. The communications environment 100 may include a number of IoE devices 102*a*-102*i*, a number of base stations 104*a*-104*b*, a number of UE devices 106, a core network 108, and one or more application servers 110.

The communications environment 100 may support operation on multiple carriers (e.g., waveform signals of different frequencies). Multi-carrier transmitters can transmit modulated signals simultaneously on the multiple carriers. For example, each modulated signal may be a multi-carrier channel modulated according to the various radio technologies described above. Each modulated signal may be sent on a different carrier and may carry control information (e.g., pilot signals, control channels, etc.), overhead information, data, etc. The communications environment 100 may be a multi-carrier LTE network capable of efficiently allocating network resources. The communications environment 100 is one example of a network to which various aspects of the disclosure apply.

One or both of the base stations 104 may include an evolved Node B (eNodeB or eNB), for example. A base station 104 may also be referred to as a base transceiver station or an access point. FIG. 1 illustrates two base stations, 104*a* and 104*b*, for purposes of simplicity only. It will be recognized that there could be one to many base stations, as well as be an assortment of different types such as macro, pico, and/or femto base stations. The base stations 104 may communicate with the application server 110 via a backhaul such as core network 108. The base stations 104 may also communicate with one another directly or indirectly, such as via core network 108.

The IoE devices 102 may be dispersed throughout the communications environment 100, and each IoE device 102 may be stationary or mobile. FIG. 1 illustrates IoE devices 102*a*-102*i* for purposes of simplicity of illustration only. More or fewer may be deployed within the communications environment 100 as will be understood to those skilled in the relevant art(s). IoE devices 102*a*-102*i* may either be stand-alone or integrated within other devices. The IoE devices 102 may capture information that is then relayed to a remote system, such as application server 110 in FIG. 1. IoE devices 102 may have limited power resources because they are integrated with devices or objects, such as to render those devices or objects "smart," and need to be able to operate for long periods of time without replacement or recharge, e.g. days, weeks, months, or years. As a result, the IoE devices 102 may be synchronized, as discussed in greater detail below, such that the IoE devices 102 only awake at predefined time intervals in order to decrease power consumption.

The UEs 106 are representative of one or more UEs 106 that may be dispersed throughout the wireless network 100 and can be either stationary or mobile. The UEs 106 may also be referred to as a terminal, a mobile station, a subscriber unit, etc. The UE 106 may be a cellular phone, a smartphone, a personal digital assistant, a wireless modem, a laptop computer, a tablet computer, etc.

The application server 110 may be a central server that the IoE devices 102 are attempting to transmit data to for storage and/or analysis. The application server 110 may receive data as it is conveyed from the base stations 104 from one or more of the IoE devices 102 and make use of information from the data and/or present it to one or more users that interact with the application server 110.

The base stations 104*a* and 104*b* may have a sufficiently large coverage area that one or more of the IoE devices 102*a*-102*i* and/or UEs 106 can receive data, from one or both of the base stations 104*a* and 104*b*, via a downlink. The downlink (or forward link) refers to the communication link from a base station 104 to the IoE devices 102 and/or UEs 106. Although capable of establishing a downlink with a base station 104, in some instances one or more of the IoE devices 102 may not have sufficient power to be able to establish an uplink to a base station 104. The uplink (or reverse link) refers to the communication link from an IoE device 102 (or a UE 106) to a base station 104. Further, in some instances an IoE device may not be able to establish an uplink or a downlink connection with a base station 104. In such instances, the IoE device 102 may utilize communications with other IoE devices 102 and/or UEs 106 to facilitate indirect communication with a base station 104. Examples of such indirect communication approaches are described in U.S. patent application Ser. No. 14/107,195, filed Dec. 16, 2013 and titled "A HYBRID RELAY SCHEME," U.S. patent application Ser. No. 14/107,221, filed Dec. 16, 2013 and titled "RELAY SCHEME BETWEEN NARROW FREQUENCY BAND AND BROAD FREQUENCY BAND DEVICES," U.S. Provisional Patent Application No. 62/078,755, filed Nov. 12, 2014 and titled "OPPORTUNISTIC IOE MESSAGE DELIVERY VIA SENSOR-TRIGGERED FORWARDING," and/or U.S. Provisional Patent Application No. 62/078,711, filed Nov. 12, 2014 and titled "OPPORTUNISTIC IOE MESSAGE DELIVERY VIA WAN-TRIGGERED FORWARDING," each of which is hereby incorporated by reference in its entirety.

IoE devices 102 can be capable of linking to each other, for example via D2D links. In an embodiment, the IoE devices 102 link to each other by sending out discovery messages to determine what other IoE devices 102 may be within a neighboring vicinity. Each of the IoE devices 102 may maintain its own routing table, for example as established over time based on a listening and learning procedure. Discovery may occur periodically or when an IoE device 102 is first added to the communications environment 100. As just one example, for purposes of discussion assuming IoE device 102*c* is newly added to the communications environment 100, IoE device 102*c* may send out a discovery message or beacon to locate any other IoE devices 102 that may be within sufficient proximity to respond. Here, IoE devices 102*a* and 102*d* may respond, thereby establishing a D2D link between IoE devices 102*c* and 102*a* and between IoE devices 102*c* and 102*d*. Alternatively, one or both of IoE devices 102*a* and 102*d* may periodically send out a discovery message or beacon and discover IoE device 102*c* when it is newly in proximity, and links may thereby be established.

The IoE devices 102 in close proximity to each other can form synchronized groups of IoE devices 102. In that regard, asynchronous IoE devices 102 that are in D2D communication with one another can synchronize their timing to a common synchronization timing signal (e.g., using any suitable self-organized peer-to-peer (P2P) networking scheme, such as WiFi Direct). In FIG. 1, three groups 112, 114, and 116 of synchronized IoE devices are shown. In particular, group 112 includes IoE devices 102*a*, 102*b*, 102*c*, and 102*d*, group 114 includes IoE devices 102*e*, 102*f*, and 102*g*, and group 116 includes IoE devices 102*h* and 102*i*. It is understood that each group 112, 114, and 116 are shown for simplicity of illustration and that each group 112, 114, and 116 may include any number of IoE devices 102. Techniques for synchronizing the timing of the IoE devices 102 within each group 112, 114, and 116 and/or across two or more of the groups 112, 114, and 116 are discussed in greater detail below.

Figure 2:
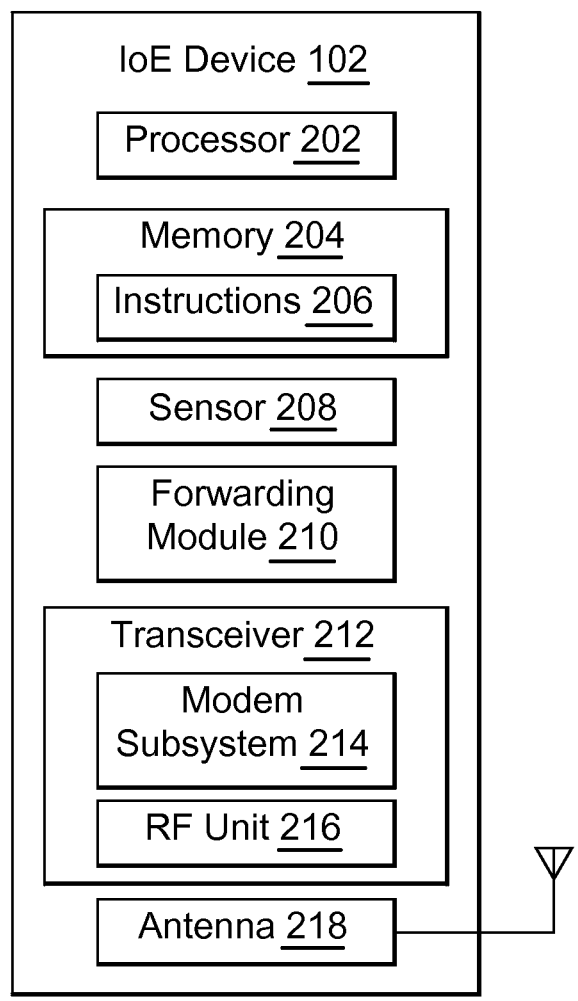
FIG. 2 is a block diagram of an exemplary IoE device according to embodiments of the present disclosure.

FIG. 2 is a block diagram of an exemplary IoE device 102 according to embodiments of the present disclosure. The IoE device 102 may have any one of many configurations for various IOE applications described above. The IoE device 102 may include a processor 202, a memory 204, a sensor 208, a forwarding module 210, a transceiver 212, and an antenna 218. These elements may be in direct or indirect communication with each other, for example via one or more buses.

The processor 202 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein with reference to the IoE devices 102 introduced above with respect to FIG. 1 and discussed in more detail below. The processor 202 may also be implemented as a combination of computing devices, e.g., a combination of a DSP and a microprocessor, a plurality of microprocessors, one or more microprocessors in conjunction with a DSP core, or any other such configuration.

The memory 204 may include a cache memory (e.g., a cache memory of the processor 442), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 204 includes a non-transitory computer-readable medium. The memory 204 may store instructions 206. The instructions 206 may include instructions that, when executed by the processor 202, cause the processor 202 to perform the operations described herein with reference to the IoE device 102 in connection with embodiments of the present disclosure. Instructions 206 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The sensor 208 may be any sensor or meter capable of perceiving and capturing information about some aspect of its environment. This could include service metering (e.g., for gas utilities), temperature monitoring, pressure monitoring, fluid flow monitoring, inventory level monitoring, water level monitoring, equipment status monitoring, wildlife tracking, weather event monitoring, geological event monitoring, fleet tracking, and transaction-based business charging, to name just a few examples. Sensor 208 may send any information it captures as data to the transceiver 212 for opportunistic transmission to a remote site, such as application server 110. Sensor 208 may also send any information it captures as data to the memory 204 for temporary or permanent storage.

The forwarding module 210 may be used to determine what time slots the IoE device 102 will use for sending its own data messages as well as other acts of communication between other IoE devices 102. The forwarding module 210 may analyze timing synchronization signals received from other IoE devices 102, a base station 104, or UE 106 in order to determine whether the timing synchronization signals should be implemented. This determination can include determining whether the received timing synchronization signal ranks higher than a current timing synchronization. When a particular timing synchronization signal is to be implemented, the forwarding module 210 may also determine whether the timing synchronization signal should be forwarded on to other IoE devices 102 and, if so, which IoE devices 102. In this regard, the forwarding module 210 may check a routing table for an identifier of the IoE devices 102 to which the timing synchronization signal should be forwarded. The forwarding module 210 may use the routing table to direct the transceiver 212 on where the timing synchronization signals should be forwarded to. Generally, any suitable flooding, multicast, or broadcast scheme may be utilized to ensure that all of the IoE devices 102 within a group of synchronized IoE devices receive the updated timing synchronization. In this regard, the receiving IoE devices 102 may send acknowledgement(s) of the receipt of the updated timing synchronization to the sending IoE device(s).

The transceiver 212 may include a modem subsystem 214 and a radio frequency (RF) unit 216. The transceiver 212 is configured to communicate bi-directionally with other devices, such as base stations 104 and/or UE 106. The modem subsystem 214 may be configured to modulate and/or encode the data from the sensor 208 and/or the forwarding module 210 according to a modulation and coding scheme (MCS), e.g., a low-density parity check (LDPC) coding scheme, a turbo coding scheme, a convolutional coding scheme, etc. The RF unit 216 may be configured to process (e.g., perform analog to digital conversion or digital to analog conversion, etc.) modulated/encoded data from the modem subsystem 214 (on outbound transmissions) or of transmissions originating from another source such as a base station 104 or a UE 106. Although shown as integrated together in transceiver 212, the modem subsystem 214 and the RF unit 216 may be separate devices that are coupled together at the IoE device 102 to enable the IoE device 102 to communicate with other devices.

The RF unit 216 may provide the modulated and/or processed data, e.g. data packets (or, more generally, data messages which may contain one or more data packets and other information), to the antenna 218 for transmission to one or more other devices. This may include, for example, transmission of data messages to another IoE device 102 via a D2D link, to a UE 106 for relay to a base station 104, or to a base station 104, according to embodiments of the present disclosure. The antenna 218 may further receive data messages transmitted from a base station 104, UE 106, and/or other IoE device 102 and provide the received data messages for processing and/or demodulation at the transceiver 212. Although FIG. 2 illustrates antenna 218 as a single antenna, antenna 218 may include multiple antennas of similar or different designs in order to sustain multiple transmission links.

Figure 3:
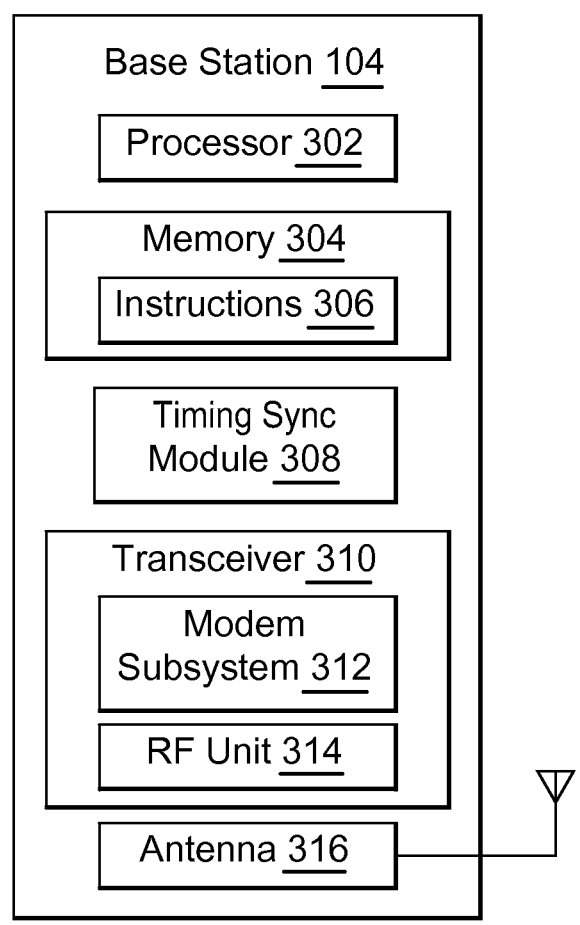
FIG. 3 is a block diagram of an exemplary base station according to embodiments of the present disclosure.

FIG. 3 is a block diagram of an exemplary base station 104 according to embodiments of the present disclosure. The base station 104 may include a processor 302, a memory 304, a timing synchronization module 308, a transceiver 310, and an antenna 316. These elements may be in direct or indirect communication with each other, for example via one or more buses. The base station 104 may be an evolved Node B (eNodeB), a macro cell, a pico cell, a femto cell, a relay station, an access point, or another electronic device operable to perform the operations described herein with respect to the base station 104. The base station 104 may operate in accordance with one or more communication standards, such as a 3rd generation (3G) wireless communication standard, a 4th generation (4G) wireless communication standard, a long term evolution (LTE) wireless communication standard, an LTE-advanced wireless communication standard, or another wireless communication standard now known or later developed (e.g., a next generation network operating according to a 5G protocol).

The processor 302 may include a CPU, a DSP, an ASIC, a controller, a FPGA device, another hardware device, a firmware device, or any combination thereof configured to perform the operations described herein with reference to the base station 104 introduced in FIG. 1 above. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), RAM, MRAM, ROM, PROM, EPROM, EEPROM, flash memory, a solid state memory device, one or more hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the base station 104 in connection with embodiments of the present disclosure. Instructions 306 may also be referred to as code, which may be interpreted broadly to include any type of computer-readable statement(s) as discussed above with respect to FIG. 2.

The timing synchronization module 308 may operate to perform one or more functions associated with synchronizing IoE devices 102. In some implementations, the timing synchronization module 308 maintains a ranking table that determines whether a timing synchronization signal received by an IoE device 102 should be implemented. The base station 104 may periodically broadcast the ranking information to the IoE devices 102 and/or UEs 106 within its downlink range. The ranking information can be stored in local memory of the IoE device 102 (such as memory 204) and/or the UE 106 for later reference by the IoE device 102 and/or the UE 106. Further, in some instances the base station 104 may broadcast a timing synchronization signal to the IoE devices 102 and/or UEs 106 within its downlink range that can be utilized for synchronizing communications among the IoE devices 102, between the IoE devices 102 and the UEs 106, between the UEs 106 and the base station 104, between the IoE devices 102 and the base station 104, and/or combinations thereof. The timing synchronization module 308 may generate or define the timing synchronization signal to be broadcast by the base station 104.

The timing synchronization module 308 may pass on corresponding information, signals, and/or instructions to the transceiver 310 so that the information, signals, and/or instructions may be broadcast to the IoE devices 102 and/or UEs 106 within downlink range of the base station 104. For example, this may include a timing synchronization ranking hierarchy, timing offset(s) of available timing synchronization(s), origin(s) of available timing synchronization(s), implementation timing and/or delay schedule(s) for implementing updated timing synchronization(s), and/or other data related to timing synchronization. The transceiver 310 may include a modem subsystem 312 and a radio frequency (RF) unit 314. The transceiver 310 is configured to communicate bi-directionally with other devices, such as IoE devices 102 and/or a UE 106. The modem subsystem 312 may be configured to modulate and/or encode data according to a MCS, some examples of which having been listed above with respect to FIG. 2. The RF unit 314 may be configured to process (e.g., perform analog to digital conversion or digital to analog conversion, etc.) of modulated/encoded data from the modem subsystem 312 (on outbound transmissions) or of transmissions originating from another source such as an IoE device 102 or a UE 106. Although shown as integrated together in transceiver 310, the modem subsystem 312 and the RF unit 314 may be separate devices that are coupled together at the base station 104 to enable the base station 104 to communicate with other devices.

The RF unit 314 may provide the modulated and/or processed data, e.g. data packets, to the antenna 316 for transmission to one or more other devices such as IoE devices 102 and the UE 106. After the transceiver 310 receives the identifying information from the gateway selection module 308, the modem subsystem 312 may modulate and/or encode the identifying information in preparation for transmission. The RF unit 314 may receive the modulated and/or encoded data packet and process the data packet prior to passing it on to the antenna 316. This may include, for example, transmission of data messages to one or more IoE devices 102 within downlink range, to a UE 106 for relay to an IoE device 102, or to another base station 104, according to embodiments of the present disclosure. The antenna 316 may further receive data messages transmitted from an IoE device 102 and/or UE 106, and provide the received data messages for processing and/or demodulation at the transceiver 310. Although FIG. 3 illustrates antenna 316 as a single antenna, antenna 316 may include multiple antennas of similar or different designs in order to sustain multiple transmission links.

Figure 4:
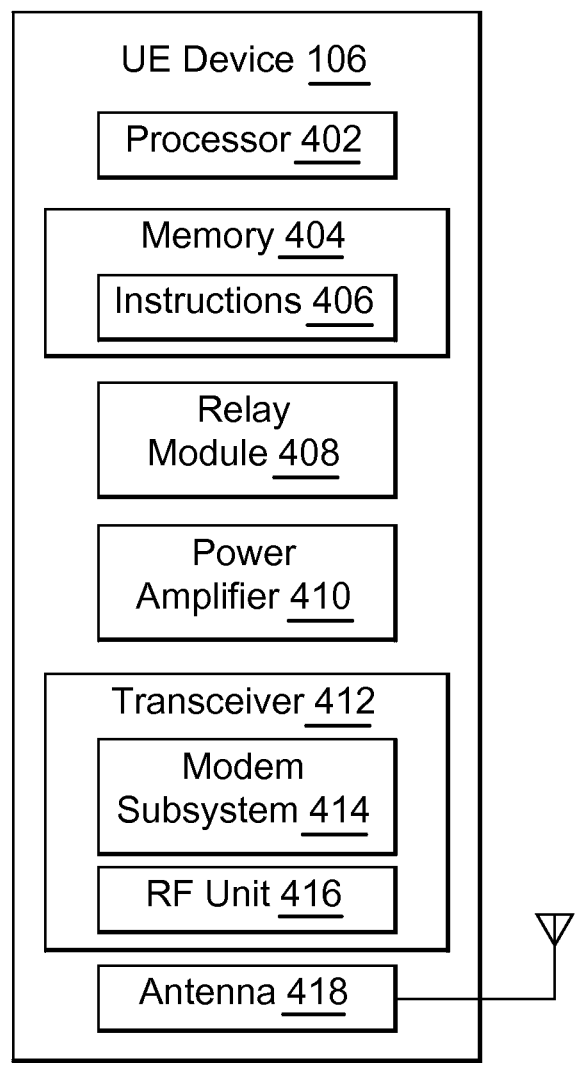
FIG. 4 is a block diagram of an exemplary UE device according to embodiments of the present disclosure.

FIG. 4 is a block diagram of an exemplary UE 106 according to embodiments of the present disclosure. The UE 106 may be a mobile communication device (e.g., a smartphone, a cellular telephone, a personal digital assistant, etc.), a tablet computing device, a laptop computing device, a vehicle, a gaming console, a machine, a personal computing device, an e-reader device, a sensor device, another electronic device, or a combination of these devices, to name a few examples, that is operable to perform the operations described herein with respect to the UE 106. The UE 106 may include a processor 402, a memory 404, a relay module 408, a power amplifier 410, a transceiver 412, and an antenna 418. These elements may be in direct or indirect communication with each other, for example via one or more buses.

The processor 402 may include a CPU, a DSP, an ASIC, a controller, a FPGA device, another hardware device, a firmware device, or any combination thereof configured to perform the operations described herein with reference to the UE 106 introduced in FIG. 1 above. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 302), RAM, MRAM, ROM, PROM, EPROM, EEPROM, flash memory, a solid state memory device, one or more hard disk drives, other forms of volatile and non-volatile memory, or a combination of different types of memory. In an embodiment, the memory 404 includes a non-transitory computer readable medium. The memory 404 may store instructions 406. The instructions 406 may include instructions that, when executed by the processor 402, cause the processor 402 to perform the operations described herein with reference to the UE 106 in connection with embodiments of the present disclosure. Instructions 406 may also be referred to as code, which may be interpreted broadly to include any type of computer-readable statement(s) as discussed above with respect to FIG. 2.

The relay module 408 may operate to cause the UE 106 to receive uplink data messages from an IoE device 102 and relay the data messages with an amplified signal to a base station 104 that the IoE device 102 would otherwise be unable to reach with an uplink. The relay module 408 may additionally enable the UE 106 to relay downlink data messages from the base station 104 to the IoE device 102. In an embodiment, the base station 104 may transmit downlink data messages directly to an IoE device 102 due to the additional transmit power of the base station 104.

The power amplifier 410 may allow the UE 106 to communicate over long distances, for example with one or multiple base stations 104. The power amplifier 410 may operate in cooperation with the transceiver 412 and the antenna 418 to amplify signals (containing data messages) that the antenna 418 will transmit to other devices, such as base stations 104 or IoE devices 102.

The transceiver 412 may include a modem subsystem 414 and a radio frequency (RF) unit 416. The transceiver 412 is configured to communicate bi-directionally with other devices, such as IoE devices 102 and/or base stations 104. The modem subsystem 414 may be configured to modulate and/or encode data according to a MCS, some examples of which having been listed above with respect to FIG. 2. The RF unit 416 may be configured to process (e.g., perform analog to digital conversion or digital to analog conversion, etc.) modulated/encoded data from the modem subsystem 414 (on outbound transmissions) or of transmissions originating from another source such as an IoE device 102 or a base station 104. Although shown as integrated together in transceiver 412, the modem subsystem 414 and the RF unit 416 may be separate devices that are coupled together at the UE 106 to enable the UE 106 to communicate with other devices.

The RF unit 416 may provide the modulated and/or processed data, e.g. data messages, to the antenna 418 for transmission to one or more other devices such as IoE devices 102 and base stations 104. After the transceiver 412 receives a data message for transmission, the modem subsystem 414 may modulate and/or encode the data message in preparation for transmission. The RF unit 416 may receive the modulated and/or encoded data message and process the data message prior to passing it on to the antenna 418. The antenna 418 may further receive data messages transmitted from IoE device 102 and/or base stations 104, and provide the received data packets for processing and/or demodulation at the transceiver 412. Although FIG. 4 illustrates antenna 418 as a single antenna, antenna 418 may include multiple antennas of similar or different designs in order to sustain multiple transmission links.

In an embodiment, the relay module 408 may cause the UE 106 to initiate a discovery procedure to discover any IoE devices 102 that may be nearby. The relay module 408 may do so by broadcasting a discovery signal via the antenna 418. When an IoE device 102 responds to the discovery signal, the relay module 408 may proceed by sending a beacon that includes a timing synchronization signal and/or setting up a connection to the responding IoE device 102. In that regard, when a connection is established between the IoE device 102 and the UE 106, the timing synchronization signal may be sent to the IoE device 102 utilizing a UE beacon and/or utilizing a data communication channel. In an alternative embodiment or in addition, the UE 106 may respond to a discovery signal transmitted from a requesting IoE device 102 and proceed with sending the beacon that includes a timing synchronization signal and/or setting up a connection to the IoE device 102 that transmitted the discovery signal. Further, in some embodiments, the UE 106 may initially broadcast a beacon that includes a timing synchronization signal instead of a discovery signal. Upon receiving the beacon from the UE 106, the IoE device 102 will have received the timing synchronization signal without a need for further communication with the UE 106.

The timing synchronization information can be conveyed from the UE 106 to the IoE device 102 in several formats. For example, the UE 106 may calculate and communicate a timing offset between the current timing of the IoE device 102 and that of the updated timing synchronization being provided by the UE 106. Alternatively, the UE 106 may communicate a new origin associated with the updated timing synchronization. In that regard, the IoE device 102 may calculate an offset between its current timing and the updated timing synchronization based on the information provided by the UE 106 (e.g., timing of new origin, timing of next UE beacon, etc.). Further, in some instances, the IoE device 102 may not be capable of receiving a WAN signal from the UE 106 or base station 104. For example, many IoE devices 102 are manufactured to be extremely low cost and, therefore, may not include WAN technology. Accordingly, in some implementations the UE 106 can communicate with the IoE device 1002 using a specific radio protocol and on a channel associated with the IoE device 102 (e.g., WLAN, Bluetooth, ZigBee, etc.) such that the UE 106 adheres to the beacon protocol of the IoE device 102, but can communicate a timing correction value necessary to synchronize the IoE device 102 with an updated timing synchronization (e.g., a higher ranking timing synchronization).

Figure 5:
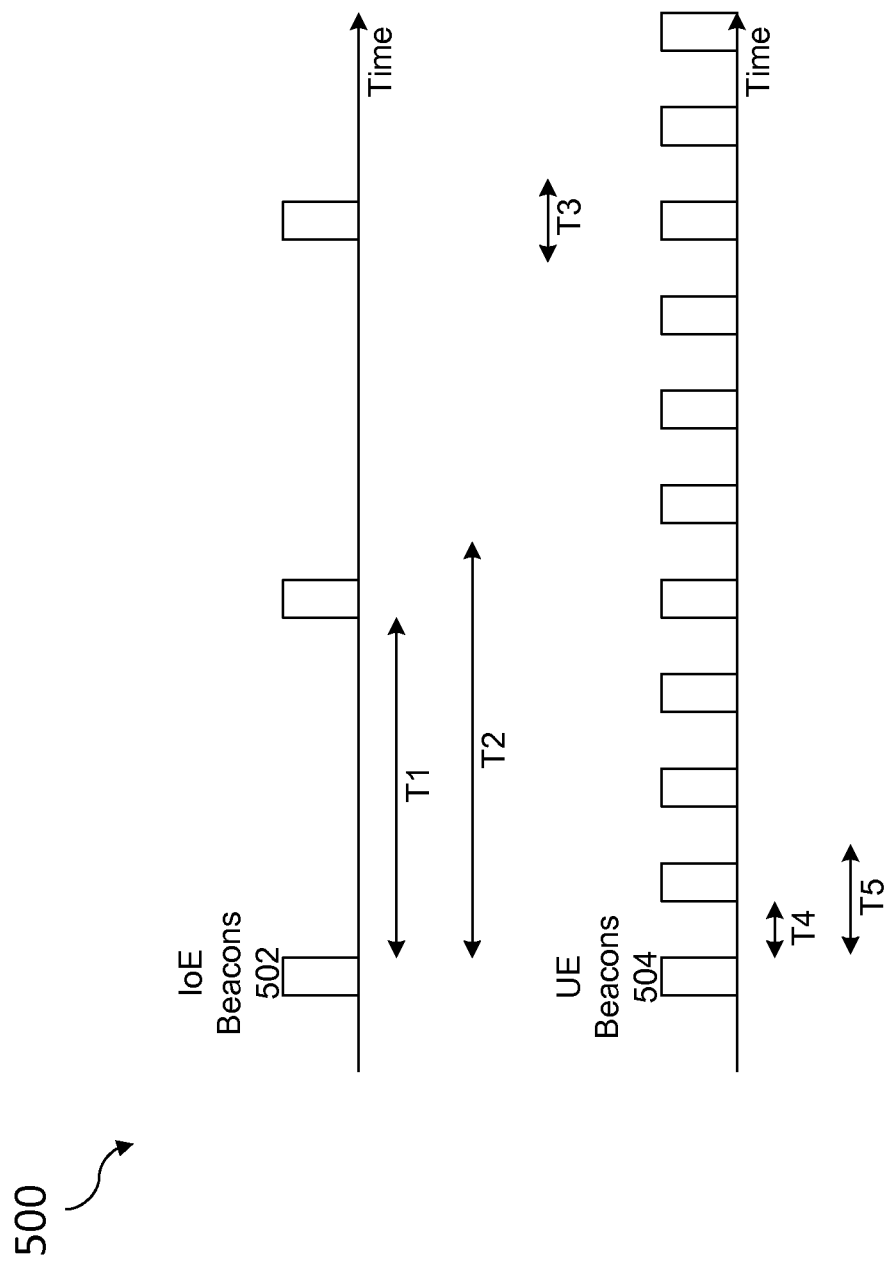
FIG. 5 is a diagram of beacon transmission and searching timing sequences in an exemplary wireless communications environment according to embodiments of the present disclosure.

FIG. 5 is a timing diagram 500 showing exemplary beacon transmissions and search intervals of devices in the exemplary wireless communication environment 100 according to embodiments of the present disclosure. When an IoE device 102 is powered up and/or introduced into the wireless communication environment 100, the IoE device 102 attempts to discover other IoE devices 102 nearby by monitoring a channel for a beacon signal from another IoE device 102. If a beacon signal is detected, then the IoE device 102 can synchronize its timing to the received beacon. If a beacon signal is not received within the initial search interval, then the IoE device 102 can start to transmit its own beacon periodically such that when another IoE device 102 is in proximity and powered up, it will discover the IoE device beacon and the two IoE devices can synchronize their timing accordingly.

The basic parameters involved in this IoE device discovery are the spacing (T1) between beacon signals 502 of the IoE device 102 and the search interval (T2) that an IoE device needs to monitor the channel to discover the presence of an IoE beacon. To minimize power consumption of the IoE device 102, it is desirable to have the spacing (T1) between beacon signals 502 be as long as possible, while having the search interval (T2) as short as possible. However, to ensure that the IoE device 102 does not miss another IoE device in its proximity, T2 should be greater than or equal to T1. In the exemplary embodiment of FIG. 5, T2 is shown being greater than T1. As a result, there is a trade-off between the power invested in transmitting beacons 502 and the power invested in searching for beacons of other IoE devices.

For initial discovery and association, an IoE device 102 may utilize a relatively long search interval (T2) to monitor the channel for other IoE devices 102. However, once a group of IoE devices have been synchronized, the IoE devices 102 only need to wake up for a relatively short interval or wake-up period (T3) when a beacon is scheduled to be sent so that time and clock parameters can be adjusted/re-synchronized among the IoE devices 102. The length of T3 depends on the length of the IoE beacon signal, timing drift due to oscillator inaccuracy between beacon synchronization periods, as well as any margin left for channel access and transmitting the beacon signal. As shown, the power costs associated with maintaining synchronization among IoE devices 102 using wake-up period (T3) is much less than the initial synchronization using search interval (T2).

A further issue in synchronizing IoE devices 102 arises in the context of multiple groups of IoE devices that are initially synchronized to different timing signals. In this regard, consider two groups of IoE devices that are originally spaced from each other and not time synchronized but move into proximity of one another (e.g., due to mobility of IoE device(s) of one or both of the groups). Because the two groups of IoE devices are in proximity, it is desirable to have the IoE devices of both groups synchronized. The challenge is how to detect that they are getting close. One solution is for each IoE device 102 to periodically do a deep search (e.g., monitor the channel for a long search interval (T2) or other extended period of time). Because such deep search costs much more power than normal synchronization maintenance (T3), it is not desired to do deep search very often, if at all, once an IoE device has been synchronized with other IoE devices. As a result, two groups of IoE devices in proximity to one another can remain out of synchronization for an extended period of time (or indefinitely) until a scheduled deep search takes place.

In accordance with the present disclosure, the opportunistic presence of one or more UEs 106 in the proximity of IoE devices 102 (e.g., UEs 106 that opportunistically enter and exit the detectable vicinity of one or more IoE devices 102) can be leveraged to achieve synchronization not only within a single group of IoE devices, but also across multiple groups of IoE devices with much lower power costs than deep searching.

As shown in FIG. 5, a UE 106 periodically broadcasts a UE beacon 504. The UE beacon 504 can include a timing synchronization signal or simply be a presence discovery signal. Because UEs 106 are less power constrained than IoE devices 102, the spacing (T4) between UE beacons 504 can be much less than the spacing (T1) between IoE beacons 502. For example, in some implementations T1 is more than five minutes, such as 10 minutes, 30 minutes, 1 hour, 4 hours, 8 hours, 12 hours, 24 hours, or other suitable time period, while T4 is less than five minutes, such as 1 minute, 30 seconds, 10 seconds, or other suitable time period. As a result, in accordance with the present disclosure, the IoE devices 102 of a synchronized group can periodically search for the UE beacon 504 during a search interval (T5). To ensure that the IoE device 102 does not miss a UE in its proximity, T5 should be greater than or equal to T4. In the exemplary embodiment of FIG. 5, T5 is shown being greater than T4. In an embodiment, the IoE device 102 may, upon detection of a UE beacon 504, transition from the search interval (T2) to the search interval (T5) that is shorter than (T2), which may reduce the power burden on the IoE devices 102.

To further reduce the power burden on the IoE devices 102, the IoE devices 102 within a synchronized group can coordinate monitoring for UE beacons 504 such that the IoE devices take turns monitoring the channel for the UE beacons 504.

Once an IoE device 102 discovers the UE beacon 504, the IoE device 102 can inform the other IoE devices 102 of its synchronized group to synchronize their IoE beacon 502 to the UE beacon 504. For example, the IoE device 102 can communicate an updated timing synchronization signal to the other IoE devices 102 via D2D communications (e.g., during the next available IoE beacon signal 502 when the other IoE devices 102 wake up for re-synchronization). For example, the IoE devices 102 can broadcast the updated timing synchronization signal in a multi-hop manner, either based on a flooding scheme or a routing scheme established over time and as indicated in a routing table in each IoE device 102. In some instances, there can be a time after the initial introduction of the updated timing synchronization signal into a group of IoE devices where a subset of the IoE devices have received the updated timing synchronization, while another subset has not. In order to prevent (or at least reduce) this potential asynchronization, the timing synchronization signal sent to the other IoE devices can include an implementation timing and/or delay schedule instructing the IoE device as to when the updated timing synchronization should be implemented. For example, the implementation timing and/or delay schedule may define when the IoE device should switch from the current timing synchronization to the updated timing synchronization at a particular start time (e.g., based on either an existing or updated clock entry), based on a particular delay time (e.g., based on a number of wake-up periods (i.e., n wake-up periods from receiving the updated timing synchronization signal or other reference point) or an amount of time (i.e., x seconds, minutes, hours, etc. from receiving the updated timing synchronization signal or other reference point), and/or other suitable timing schedule. It is understood that the delays may vary between IoE devices to account for the variances in when the IoE devices receive the updated timing synchronization signal (e.g., based on the number of hops the IoE device is from an originating IoE device) and/or the amount of time necessary for the IoE device to implement the change.

As the two (or more) groups of IoE devices discover the UE beacon 504 and synchronize their respective IoE beacons 502 to the UE beacon 504, each group will be synchronized to the same timing synchronization signal. As a result, if and when the IoE devices 102 of two groups come into proximity, they will discover each other's IoE beacons 502 (due to the fact that each group is relying on the same timing synchronization signal received from the UE) and can merge into one synchronized group of IoE devices. Again, once the groups of IoE devices have merged, the cost of maintaining timing synchronization is insignificant/minimal (T3).

Figure 6:
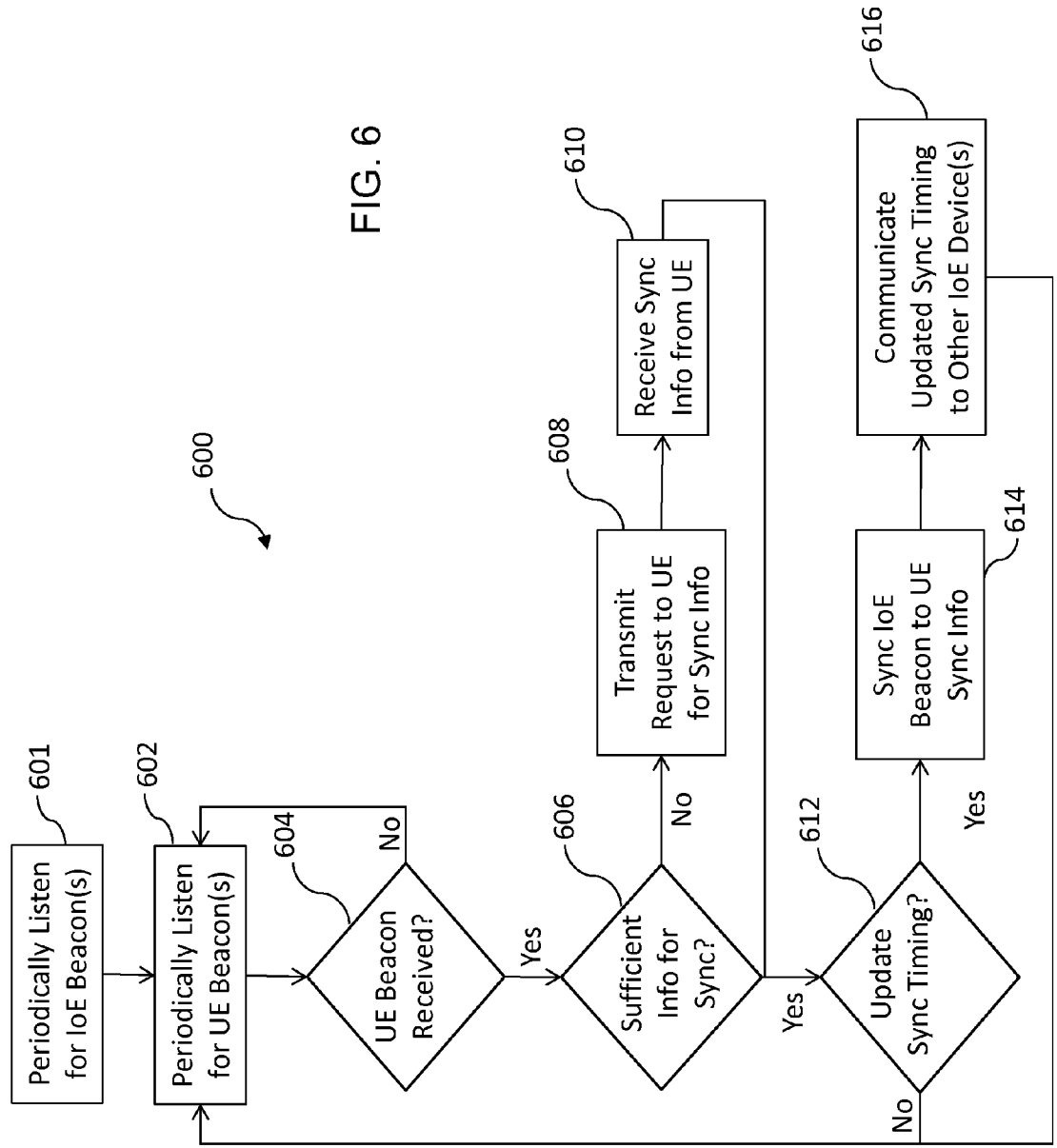
FIG. 6 is a flowchart illustrating an exemplary method for synchronizing IoE devices according to embodiments of the present disclosure.

FIG. 6 is a flowchart illustrating an exemplary method 600 for synchronizing IoE devices 102 according to embodiments of the present disclosure. Aspects of the method 600 may be implemented in an IoE device 102. In this regard, the IoE device 102 may be in communication with other IoE devices 102 and a UE 106.

At step 601, the IoE device 102 listens for an IoE beacon(s). This may occur, for example, during a search interval (e.g., T2) when the IoE device is powered on (or introduced into a network) or wake-up period (e.g., T3) that has been synchronized to a timing synchronization signal received from another IoE device 102, a base station 104, or a UE 106. When the IoE device 102 receives an IoE beacon at step 601, the IoE device can synchronize its clock, timing, and or other parameters to the received IoE beacon.

At step 602, the IoE device 102 listens for a UE beacon. This may occur, for example, during a search interval (e.g., T5) or wake-up period that has been synchronized to a timing synchronization signal received from another IoE device 102, a base station 104, or a UE 106. In some instances, the time duration (e.g., T5) of listening for the UE beacon(s) (step 602) is much shorter than the time duration (e.g., T2) of listening for the IoE beacon(s) (step 601). Due to the shorter time duration and, therefore, lower power costs, the IoE device 102 may listen for the UE beacon(s) more frequently.

At step 604, the IoE device 102 determines whether a UE beacon has been received. If a UE beacon has not been received during the search interval or wake-up period of the IoE device 102, then the method 600 returns to step 602 where the IoE device 102 will listen for a UE beacon during the next scheduled search interval or wake-up period. If a UE beacon has been received during the search interval or wake-up period, then the method 600 continues to step 606.

At step 606, the IoE device 102 determines whether the UE beacon received includes sufficient information for timing synchronization. In this regard, in some instances the UE beacon can be a discovery signal that indicates the presence of the UE 106 (e.g., that the UE 106 has just entered a vicinity of the IoE device 102 and is now detectable), but does not include a timing synchronization signal. If the IoE device 102 determines that the UE beacon received does not include sufficient information for timing synchronization, then the method proceeds to step 608 where the IoE device 102 transmits a request to the UE for timing synchronization information. At step 610, the IoE device 102 receives the requested timing synchronization information from the UE 106. The UE 106 may transmit the requested timing synchronization information as part of a timing synchronization signal, as part of a UE beacon, as part of a data channel, and/or other suitable signal transmission to the IoE device 102. Once the IoE device 102 has received the requisite timing synchronization information (either at step 606 or step 610), the method 600 continues to step 612.

At step 612, the IoE device 102 determines whether its timing should be updated based on the synchronization timing information received from the UE. In some instances, the IoE device 102 determines whether its synchronization timing should be updated by comparing the synchronization timing signal received from the UE to an existing synchronization timing signal to see which has a higher timing priority rank. For example, the IoE device (or another device in communication with the IoE device, such as another IoE device, a UE, or a base station) may look up the respective synchronization timings in a lookup table to determine which has the higher rank. Generally, synchronization timings having greater global applicability (e.g., Global Positioning System (GPS) timing, base station timing, etc.) may be preferred over synchronization timings having more local applicability (e.g., UE specific timing, IoE specific timing, etc.). However, it is understood that the priority ranking of the synchronization timings for a particular IoE device or group of IoE devices can take into account many factors that may result in a local synchronization timing being preferred in some instances. In some instances, the relative rank or priority of a synchronization timing signal can be inferred by the IoE device 102 based on one or more characteristics (e.g., frequency, channel, bandwidth, power, etc.) of the beacon and/or synchronization timing signal received from the UE 106. For example, in some instances a higher frequency is indicative of a better synchronization timing signal and may have less concern for power burn. In such instances, the higher the frequency of the beacon, the higher the rank of the synchronization timing signal. Accordingly, the IoE device 102 may compare the characteristic(s) (e.g., frequency, channel, bandwidth, power, etc.) of the beacon and/or synchronization timing signal received from the UE 106 to those associated with the current timing of the IoE device 102 to determine whether the new synchronization timing has a higher rank or priority than the current synchronization timing.

In some instances, an IoE device 102 may encounter two or more network timing sources that have the same level or ranking in the timing hierarchy that are not synchronized among themselves. In such instances, the IoE device 102 (or other network device, such as another IoE device 102, a base station 104 or UE 106) can decide on the preferred timing of equally ranked sources (e.g., by how often the timing overlap occurs). Further, the offsets for the alternative timing sources may be tracked by recording the time difference between their timing reference signals.

If, at step 612, it is determined that the existing synchronization timing has a higher timing priority rank, then the existing synchronization will be maintained. As a result, the synchronization timing will not be updated and the method 600 will return to step 602. If the synchronization timing associated with the synchronization timing signal received from the UE 106 has a higher timing priority rank than the existing synchronization timing signal, then the method 600 continues to step 614.

At step 614, the IoE device 102 synchronizes its beacon to the synchronization timing signal received from the UE 106. In some instances, the IoE device 102 changes its reference clock to match that of the synchronization timing signal received from the UE 106. In other instances, the IoE device 102 maintains its existing reference clock, but stores an offset value representing the difference between its existing reference clock and the reference clock timing associated with the synchronization timing signal received from the UE 106. As a result, the offset can be utilized to synchronize communications with other wireless communication devices, including IoE devices 102, UEs 106, base station(s) 104, etc., without the need to change the existing reference clock of the IoE device.

At step 616, the IoE device 102 communicates the updated synchronization timing signal to other IoE devices 102. In this regard, the IoE device 102 may communicate the updated synchronization timing via D2D communications (e.g., during the next available IoE beacon signal when the other IoE devices 102 wake up for re-synchronization). For example, the other IoE devices may receive the updated synchronization timing during step 601 when listening for IoE beacon(s). It is understood that steps 614 and 616 may be performed in any order and/or simultaneously. The method 600 then returns to step 602 where the IoE device 102 will listen for a UE beacon during the next scheduled search interval or wake-up period.

Figure 7:
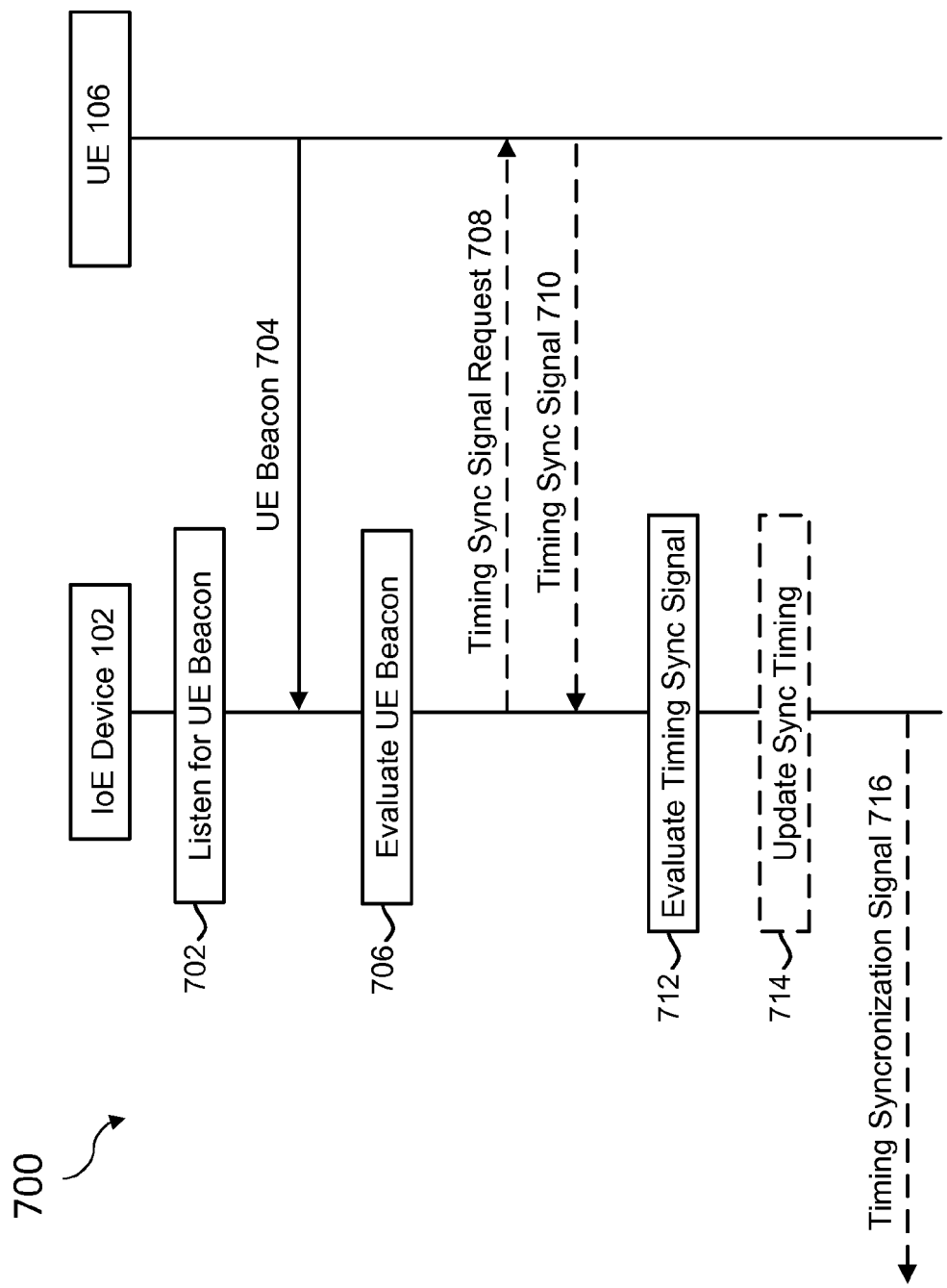
FIG. 7 is a diagram of a communication protocol between devices in an exemplary wireless communications environment according to embodiments of the present disclosure.

FIG. 7 is a diagram of a communications protocol 700 between devices in the exemplary wireless communications environment 100 according to embodiments of the present disclosure. Aspects of the protocol 700 may be implemented in an IoE device 102 and/or UE 106. In this regard, the IoE device 102 and UE 106 may be in communication with each other and/or other IoE devices 102 and UEs 106. In some aspects, the communications protocol 700 can be utilized to implement the method 600 described above.

As shown, the IoE device 102 initially listens 702 for a UE beacon, which may correspond to step 602 of method 600. This may occur, for example, during a wake-up period that has been synchronized to a timing synchronization signal received as part of a beacon and/or other signal transmitted from another IoE device 102, a base station 104, or a UE 106. The wake-up period of the IoE device 102 may be synchronized with the wake-up period of one or more IoE devices in which the IoE device 102 is in D2D communication. A wake-up period may include a plurality of time slots that are used to implement various aspects of the present disclosure. Assigning these time slots with sufficiently small duty cycle may reduce the power consumption of the IoE devices 102, which can assist in prolonging the life of the IoE devices 102. In an embodiment, a base station 104 and/or a UE 106 may allocate the time slots via beacons or other signals they transmit to the IoE devices. Alternatively, the IoE devices 102 may cooperate together to allocate the time slots. In some instances, IoE devices 102 within a group of IoE devices take turns listening for the UE beacon.

The UE 106 transmits a UE beacon 704 that may be received by the IoE device 102. The IoE device 102 can then evaluate (706) the UE beacon 704 in a manner similar to step 606 of method 600. In response to the evaluation of the UE beacon, the IoE device can transmit a timing synchronization signal request 708 to the UE 106, similar to step 608 of method 600. The UE 106 can transmit a timing synchronization signal 170 to the IoE device 102 in response to receiving the timing synchronization signal request 708 from the IoE device, similar to step 610 of method 600. It is understood that the transmission of signals 708 and 710 may not be needed in some instances (e.g., where the UE beacon 704 includes sufficient timing synchronization information for use by the IoE device 102). For this reason, the signals 708 and 710 are shown with dashed lines.

The IoE device 102 evaluates (712) the timing synchronization signal 710 (or the timing synchronization signal received as part of the UE beacon 704) in a manner similar to step 612 or method 600. If, based on the evaluation (712), the timing synchronization of the IoE device should be updated, then the IoE device 102 updates (714) its synchronization timing based on the received timing synchronization signal and transmits a corresponding timing synchronization signal 716 to other IoE devices 102 (e.g., via D2D communication). In response to receiving the timing synchronization signal 716, the other IoE devices 102 can similarly update their timing synchronizations such that the group of IoE devices is synchronized to the updated timing synchronization. The communication protocol 700 may then continue with the IoE device 102 again listening (702) for a UE beacon and repeat the same process during each search interval (T3) or wake-up period.

Figure 8:
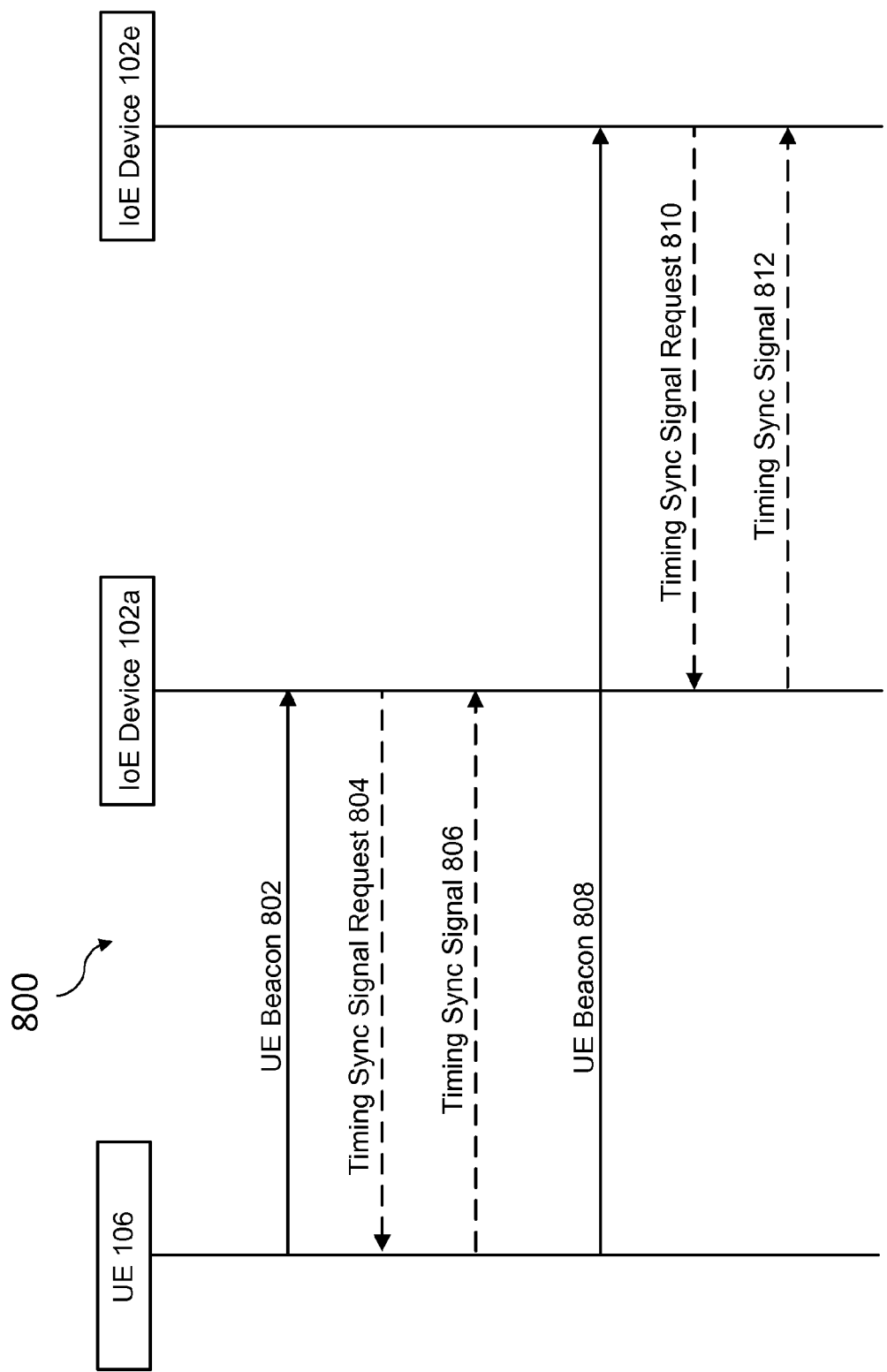
FIG. 8 is a diagram of a communication protocol between devices in an exemplary wireless communications environment according to embodiments of the present disclosure.

FIG. 8 is a diagram of a communications protocol 800 between devices in the exemplary wireless communications environment 100 according to embodiments of the present disclosure. Aspects of the protocol 800 may be implemented in a UE 106 and/or IoE devices 102. It is understood that the UE 106 and the IoE devices 102 may be in communication with each other and/or other IoE devices 102 and UEs 106. In this regard, for simplicity in explaining the concepts, IoE device 102a of the IoE device group 112 (consisting of IoE devices 102a, 102b, 102c, and 102d) and IoE device 102e of the IoE device group 114 (consisting of IoE devices 102e, 102f, and 102g) of the wireless communications environment 100 of FIG. 1 are depicted.

As shown, the UE 106 transmits a UE beacon 802 that may be received by the IoE device 102a. The UE beacon 802 can include timing synchronization information. Alternatively, the UE beacon 802 can be a discovery signal that does not include timing synchronization information. The UE beacon 802 may be received by the IoE device 102a when the UE 106 is in proximity to the IoE device 102a. In response to receiving the UE beacon 802, the IoE device 102a may transmit a timing synchronization signal request 804 to the UE 106. In this regard, the timing synchronization signal request 804 may be transmitted by the IoE device 102a when the UE beacon 802 is a discovery signal or does not include sufficient information for the IoE device 102a to implement an updated timing synchronization. The UE 106 can transmit a timing synchronization signal 806 to the IoE device 102a in response to receiving the timing synchronization signal request 804 from the IoE device 102a. The IoE device 102a may then update its synchronization timing based on the timing synchronization signal 806 and/or communicate an updated timing synchronization signal to the other IoE devices 102b, 102c, and/or 102d of the IoE device group 112. As a result, the IoE devices 102a, 102b, 102c, and 102d of the IoE device group 112 can all be synchronized based on the updated timing synchronization signal received from the UE (either as part of UE beacon 802 or timing synchronization signal 806). It is understood that the transmission of signals 804 and 806 may not be needed in some instances (e.g., where the UE beacon 802 includes sufficient timing synchronization information for use by the IoE device 102a). For this reason, the signals 804 and 806 are shown with dashed lines.

The UE 106 also transmits a UE beacon 808 that may be received by the IoE device 102e. The UE beacon 808 may be the same as UE beacon 802. In that regard, the UE beacons 802 and 808 may be a single beacon transmission that is received by both IoE devices 102a and 102e. Alternatively, the transmission of the UE beacon 802 may occur at one point in time and the transmission of the UE beacon 808 may occur at a different point in time (either earlier or later). In this regard, the UE 106 may have moved from a position in proximity to IoE device 102a to a position in proximity to IoE device 102e (or vice versa) in the time period between the transmissions of UE beacons 802 and 808.

The UE beacon 808 can include timing synchronization information. Alternatively, the UE beacon 808 can be a discovery signal that does not include timing synchronization information. The UE beacon 808 may be received by the IoE device 102e when the UE 106 is in proximity to the IoE device 102e. In response to receiving the UE beacon 808, the IoE device 102e may transmit a timing synchronization signal request 810 to the UE 106. In this regard, the timing synchronization signal request 810 may be transmitted by the IoE device 102e when the UE beacon 808 is a discovery signal or does not include sufficient information for the IoE device 102e to implement an updated timing synchronization. The UE 106 can transmit a timing synchronization signal 812 to the IoE device 102e in response to receiving the timing synchronization signal request 810 from the IoE device 102e. Again, it is understood that the transmission of signals 810 and 812 may not be needed in some instances (e.g., where the UE beacon 808 includes sufficient timing synchronization information for use by the IoE device 102e). For this reason, the signals 810 and 812 are shown with dashed lines.

The IoE device 102e may then update its synchronization timing based on the timing synchronization signal 812 and/or communicate an updated timing synchronization signal to the other IoE devices 102f and/or 102g of the IoE device group 114. As a result, the IoE devices 102e, 102f, and 102g of the IoE device group 114 can all be synchronized based on the updated timing synchronization signal received from the UE (either as part of UE beacon 808 or timing synchronization signal 812). Further, since the two groups of IoE devices 1112 and 114 are synchronized to the same UE 106, if and when the IoE devices 102 of two groups come into proximity, they will discover each other's IoE beacons and can merge into one larger synchronized group of IoE devices as described above.

Figure 9:
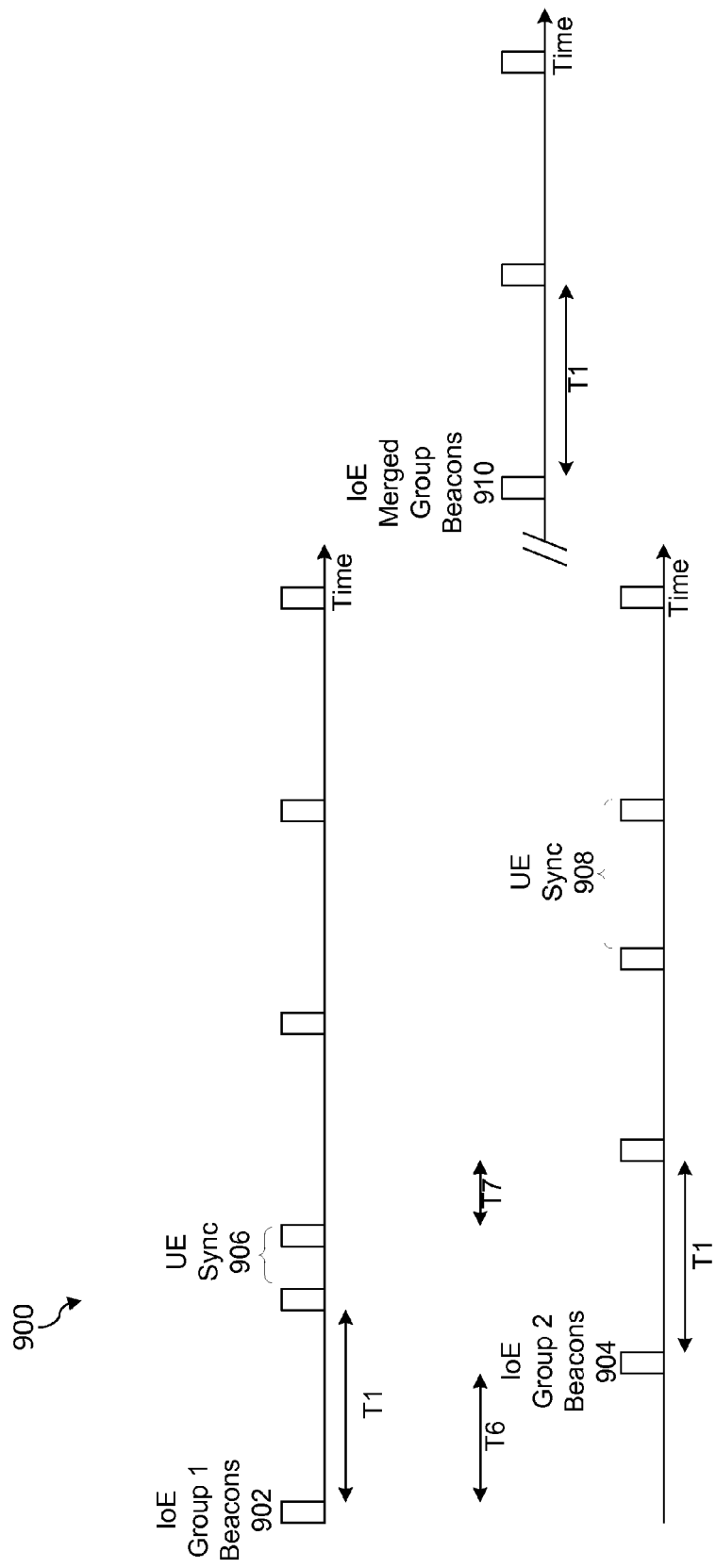
FIG. 9 is a diagram of beacon transmissions in an exemplary wireless communications environment according to embodiments of the present disclosure.

FIG. 9 is a diagram 900 of beacon transmissions in an exemplary wireless communications environment according to embodiments of the present disclosure. In particular, the diagram 900 illustrates a situation in accordance with the present disclosure where two groups of IoE devices are independently synchronized to a common synchronization timing and then merge into one synchronized group of IoE devices when the two groups come into proximity of one another. As shown, the IoE devices of a first group of synchronized IoE devices (IoE Group 1) emit beacons 902, while the IoE devices of a second group of synchronized IoE devices (IoE Group 2) emit beacons 904. Initially, the beacons 902 and 904 are offset in time, as indicated by T6. Due to the offset (T6), even if the two groups were to come into proximity of one another, the groups would be unlikely to discover each other without a power consuming deep search by at least one of the IoE devices.

As shown in FIG. 9, at some point in time IoE Group 1 opportunistically synchronizes with a UE (906) using one or more of the techniques discussed above, for example, with respect to FIGS. 5-8. As a result, the timing of the beacons 902 of IoE Group 1 is adjusted based on the updated synchronization signal, which can be a global and/or base station based timing in some instances. For example, the updated timing of the IoE beacons 902 can cause a new offset, T7, with respect to the IoE beacons 904 of IoE Group 2. However, because the beacons 902 and 904 remain offset in time, the groups would still be unlikely to discover one another.

As also shown in FIG. 9, at some point in time IoE Group 2 opportunistically synchronizes with a UE (908) using one or more of the techniques discussed above, for example, with respect to FIGS. 5-8. It is understood that the UE synchronization 908 of IoE Group 2 may occur after, before, or simultaneously with UE synchronization 906 of IoE Group 1. Further, the UE synchronization 908 of IoE Group 2 may occur as a result of an IoE device 102 of IoE Group 2 receiving a UE beacon from the same UE or a different UE than that involved in the UE synchronization 906 of IoE Group 1. For example, the same UE may move through the network (e.g., as a result of mobility) such that it communicates with IoE devices from each of Group 1 and Group 2 at different times or may be positioned such that it communicates with IoE devices from both Group 1 and 2 at the same time. Alternatively, two (or more) different UEs may be synchronized to the same global and/or base station based timing such that each of the different UEs communicates the same timing synchronization to the IoE Groups 1 and 2 during the synchronizations 906 and 908. In this manner, each of IoE Groups 1 and 2 may receive the same timing synchronization signal despite communicating with different UEs.

As a result of the UE synchronization 908, the timing of the beacons 904 of IoE Groups 2 is adjusted based on the updated synchronization signal. As shown, when the beacons 902 of IoE Group 1 have also been adjusted to the same synchronization signal (as a result of UE synchronization 906), the IoE beacons 902 of IoE Group 1 and the IoE beacons 904 of IoE Groups 2 will be synchronized. At some point in time, IoE devices from IoE Groups 1 and 2 may come into proximity of one another. Since both IoE Groups 1 and 2 are synchronized to the same timing, the IoE devices can discover the IoE devices of the other group during the synchronized wake-up period (T3) common to both groups. As a result, IoE Groups 1 and 2 can merge into a larger IoE Merged Group. As shown, the IoE devices of the IoE Merged Group emit beacons 910. Alternatively, instead of merging into a larger group, the IoE Groups 1 and 2 may continue operating as separate groups synchronized to the same updated timing synchronization signal indefinitely (e.g., when the IoE devices are stationary and, therefore, do not come into proximity of one another).

Information and signals may be represented using any of a variety of different technologies and techniques in accordance with the present disclosure. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Embodiments of the present disclosure include a wireless communication device comprising means for generating data from a detected event; means for receiving an updated timing synchronization signal from a first wireless communication device; means for communicating the updated timing synchronization signal to at least one other wireless communication device; and means for synchronizing timing with the at least one other wireless communication device based on the updated timing synchronization signal.

The wireless communication device further includes wherein the means for receiving the updated timing synchronization signal is configured to receive the updated timing synchronization signal from a user equipment (UE). The wireless communication device further includes means for receiving a discovery signal from the UE; and means for transmitting a request for the updated timing synchronization signal to the UE in response to receiving the discovery signal. The wireless communication device further includes wherein the means for receiving the updated timing synchronization signal is configured to receive the updated timing synchronization signal as part of a UE beacon. The wireless communication device further includes wherein the means for receiving the updated timing synchronization signal is configured to receive the updated timing synchronization signal as part of a signal transmission that is separate from a UE beacon. The wireless communication device further includes means for synchronizing timing with the at least one other wireless communication device to a first timing synchronization signal prior to receiving the updated timing synchronization signal. The wireless communication device further includes means for determining, in response to the receiving the updated timing synchronization signal, whether the updated timing synchronization signal should be implemented. The wireless communication device further includes wherein the means for determining is configured to determine whether the updated timing synchronization signal should be implemented by evaluating whether the updated timing synchronization signal has a higher timing priority rank than the first timing synchronization signal. The wireless communication device further includes wherein the means for communicating is configured to communicate the updated timing synchronization signal to at least one other wireless communication device in response to the updated timing synchronization signal having a higher timing priority rank than the first timing synchronization signal. The wireless communication device further includes wherein the means for communicating is configured to communicate the updated timing synchronization signal to at least one other wireless communication device using a device-to-device (D2D) communication.

Embodiments of the present disclosure further include user equipment (UE) for communicating with a wireless network comprising means for transmitting an updated timing synchronization signal to a first wireless communication device of a first group of synchronized wireless communication devices, wherein a synchronization timing of the first group of synchronized wireless communication devices can be updated based on the updated timing synchronization signal.

The UE further includes means for transmitting a discovery signal from the UE to the first wireless communication device; and means for receiving a request for the updated timing synchronization signal from the first wireless communication device. The UE further includes wherein the means for transmitting the updated timing synchronization signal is configured to transmit the updated timing synchronization signal to the first wireless communication device in response to the means for receiving receiving the request for the updated timing synchronization signal from the first wireless communication device. The UE further includes wherein the means for transmitting the updated timing synchronization signal is configured to transmit the updated timing synchronization signal as part of a UE beacon. The UE further includes wherein the means for transmitting the updated timing synchronization signal is configured to transmit the updated timing synchronization signal as part of a signal transmission that is separate from a UE beacon. The UE further includes means for transmitting the updated timing synchronization signal to a second wireless communication device of a second group of synchronized wireless communication devices, wherein a synchronization timing of the second group of synchronized wireless communication devices can be updated based on the updated timing synchronization signal such that the first and second groups of synchronized wireless communication devices will have a common synchronization timing if the synchronization timing of each group is updated based on the updated timing synchronization signal. The UE further includes wherein the updated synchronization timing signal is based on at least one of a global positioning system (GPS) timing and a base station timing.

Embodiments of the present disclosure further include a method for communicating with a wireless network comprising receiving, at a wireless communication device, a first timing synchronization signal from a first wireless communication device of a first group of wireless communication devices; synchronizing communications of the wireless communication device to the first timing synchronization signal; receiving, at the wireless communication device, a global timing synchronization signal from a first user equipment (UE); synchronizing communications of the wireless communication device to the global timing synchronization signal; receiving, at the wireless communication device, a beacon from a second wireless communication device of a second group of wireless communication devices, the second wireless communication device being synchronized to the global timing synchronization signal; and synchronizing communications of the wireless communication device with the second wireless communication device such that at least some wireless communication devices of the first and second groups of wireless communication devices merge into a combined group of wireless communication devices.

The method further includes wherein the global timing synchronization signal is received as part of a beacon of the first UE. The method further includes wherein the global timing synchronization signal is received as part of a signal transmission that is separate from a beacon of the first UE. The method further includes receiving, at the wireless communication device, a discovery signal from the first UE; and transmitting, from the wireless communication device, a request for the global timing synchronization signal to the first UE in response to receiving the discovery signal. The method further includes communicating the global timing synchronization signal to at least one other wireless communication device of the first group of wireless communication devices. The method further includes wherein the first and second groups of wireless communication devices each receive the global timing synchronization signal from a common UE. The method further includes wherein the second group of wireless communication devices receives the global timing synchronization signal from a second UE different than the first UE. The method further includes wherein the global synchronization timing is based on at least one of a global positioning system (GPS) timing and a base station timing.

Embodiments of the present disclosure further include a method for communicating with a wireless network comprising receiving, at a wireless communication device, a first timing synchronization signal from a first wireless communication device of a first group of wireless communication devices; synchronizing communications of the wireless communication device to the first timing synchronization signal; receiving, at the wireless communication device, a second timing synchronization signal from a user equipment (UE); and determining, in response to receiving the second timing synchronization signal, whether the second timing synchronization signal should be implemented by evaluating whether the second timing synchronization signal has a higher timing priority rank than the first timing synchronization signal.

The method further includes synchronizing communications of the wireless communication device to the second timing synchronization signal if the second timing synchronization signal has a higher timing priority rank than the first timing synchronization signal. The method further includes wherein the first and second timing synchronization signals are compared to a timing priority ranking hierarchy having the following rankings in order of decreasing preference: a global positioning system (GPS) timing, a base station timing, a UE timing, a WAN relay timing, a WLAN timing, and a sensor node timing. The method further includes receiving, at the wireless communication device, a timing priority ranking hierarchy. The method further includes wherein the timing priority ranking hierarchy is received from at least one of a UE, a base station, or another wireless communication device. The method further includes wherein the timing priority rank of the first and second timing synchronization signals are defined by at least one of a base station, a UE, or another wireless communication device. The method further includes wherein the synchronizing communications of the wireless communication device to the second timing synchronization signal includes updating a reference clock of the wireless communication device. The method further includes wherein the synchronizing communications of the wireless communication device to the second timing synchronization signal includes maintaining a current reference clock of the wireless communication device and utilizing an offset between the first timing synchronization signal and the second timing synchronization signal. The method further includes storing the offset in a memory of the wireless communication device. The method further includes wherein the evaluating whether the second timing synchronization signal has a higher timing priority rank than the first timing synchronization signal includes inferring a timing priority rank of the second timing synchronization signal based on at least one characteristic of the second timing synchronization signal. The method further includes wherein the at least one characteristic of the second timing synchronization signal includes at least one of a frequency, a channel, a bandwidth, and a power. The method further includes wherein the second timing synchronization signal is received as part of a beacon of the UE. The method further includes wherein the second timing synchronization signal is received as part of a signal transmission that is separate from a beacon of the UE. The method further includes receiving, at the wireless communication device, a discovery signal from the UE; and transmitting, from the wireless communication device, a request for the second timing synchronization signal to the UE in response to receiving the discovery signal. The method further includes wherein the second timing synchronization signal is received from the UE using a wide area network (WAN) communication. The method further includes wherein the second timing synchronization signal is received from the UE using at least one of wireless local area network (WLAN), Bluetooth, Bluetooth low energy (BLE), ZigBee, or radio-frequency identification (RFID) communications.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method for communicating with a wireless network, comprising:
   discovering, by a wireless communication device, a first wireless communication device;
   receiving, at the wireless communication device during a first listening interval, an updated timing synchronization signal from the first wireless communication device after discovering the first wireless communication device;
   transitioning, by the wireless communication device, from the first listening interval to a second listening interval, the second listening interval being based on an interval for transmission of the updated timing synchronization signal from the first wireless communication device, and the second listening interval being less than the first listening interval;
   communicating, by the wireless communication device, the updated timing synchronization signal to at least one other wireless communication device; and
   synchronizing, by the wireless communication device, timing with the at least one other wireless communication device based on the updated timing synchronization signal.

2. The method of claim 1, wherein the first wireless communication device comprises a user equipment (UE), the method further comprising:
   receiving the updated timing synchronization signal from the UE as part of a UE beacon.

3. The method of claim 2, further comprising:
   receiving a discovery signal from the UE; and
   transmitting a request for the updated timing synchronization signal to the UE in response to receiving the discovery signal.

4. The method of claim 1, further comprising:
   synchronizing timing with the at least one other wireless communication device to a first timing synchronization signal prior to receiving the updated timing synchronization signal;
   evaluating whether the updated timing synchronization signal has a higher timing priority rank than the first timing synchronization signal; and
   communicating the updated timing synchronization signal in response to the updated timing synchronization signal having a higher timing priority rank than the first timing synchronization signal.

5. The method of claim 1, wherein the wireless communication device and the at least one other wireless communication device are part of a first group of wireless communication devices, and the method further comprising:
   merging at least one wireless communication device of a second group of wireless communication devices into the first group of wireless communication devices, wherein the first group of wireless communication devices and the second group of wireless communication devices are each synchronized based on the updated timing synchronization signal.

6. The method of claim 5, wherein the first and second groups of wireless communication devices each receive the updated timing synchronization signal from the first wireless communication device that comprises a common user equipment (UE).

7. The method of claim 1, further comprising:
   alternating turns to monitor for further synchronization signals from the first wireless communication device between the wireless communication device and the at least one other wireless communication device.

8. The method of claim 1, wherein the updated timing synchronization signal is received from the first wireless communication device using at least one of wireless local area network (WLAN), Bluetooth, Bluetooth low energy (BLE), ZigBee, or radio-frequency identification (RFID) communications.

9. A wireless communication device, comprising:
a sensor configured to generate data from a detected event;
a transceiver configured to:
discover a first wireless communication device;
receive, during a first listening interval, an updated timing synchronization signal from the first wireless communication device after the discovery; and
communicate the updated timing synchronization signal to at least one other wireless communication device; and
a processor configured to:
transition from the first listening interval to a second listening interval, the second listening interval being based on an interval for transmission of the updated timing synchronization signal from the first wireless communication device, and the second listening interval being less than the first listening interval; and
synchronize timing with the at least one other wireless communication device based on the updated timing synchronization signal.

10. The wireless communication device of claim 9, wherein:
the first wireless communication device comprises a user equipment (UE), and
the transceiver is configured to receive the updated timing synchronization signal from the UE as part of a UE beacon.

11. The wireless communication device of claim 9, wherein the processor is further configured to:
synchronize timing with the at least one other wireless communication device to a first timing synchronization signal prior to the transceiver receiving the updated timing synchronization signal;
evaluate whether the updated timing synchronization signal has a higher timing priority rank than the first timing synchronization signal; and
communicate the updated timing synchronization signal in response to the updated timing synchronization signal having a higher timing priority rank than the first timing synchronization signal.

12. The wireless communications device of claim 9, wherein the wireless communication device and the at least one other wireless communication device are part of a first group of wireless communication devices, and wherein the processor is further configured to:
merge at least one wireless communication device of a second group of wireless communication devices into the first group of wireless communication devices,
wherein the first group of wireless communication devices and the second group of wireless communication devices are each synchronized based on the updated timing synchronization signal.

13. The wireless communication device of claim 9, wherein the transceiver is further configured to communicate the updated timing synchronization signal to the at least one other wireless communication device using a device-to-device (D2D) communication.

14. The wireless communication device of claim 9, wherein the processor is further configured to:
alternate turns between the wireless communication device and the at least one other wireless communication device to monitor for further synchronization signals from the first wireless communication device.

15. A method for communicating with a wireless network, comprising:
discovering, by a user equipment (UE), a first wireless communication device of a first group of synchronized wireless communication devices; and
transmitting, from the UE, an updated timing synchronization signal to the first wireless communication device according to a first transmission period,
wherein the first transmission period is shorter than a second transmission period associated with one or more beacons from one or more communication device of the first group of synchronized wireless communication devices, and
wherein a synchronization timing of the first group of synchronized wireless communication devices is updated based on the updated timing synchronization signal.

16. The method of claim 15, wherein the discovering further comprises:
transmitting a discovery signal from the UE to the first wireless communication device;
receiving a request for the updated timing synchronization signal from the first wireless communication device; and
transmitting the updated timing synchronization signal in response to the received request.

17. The method of claim 15, wherein the transmitting the updated timing synchronization signal comprises transmitting the updated timing synchronization signal as part of a UE beacon.

18. The method of claim 15, further comprising:
transmitting, from the UE, the updated timing synchronization signal to a second wireless communication device of a second group of synchronized wireless communication devices.

19. The method of claim 18, wherein a synchronization timing of the second group of synchronized wireless communication devices is updated based on the updated timing synchronization signal such that the first and second groups of synchronized wireless communication devices have a common synchronization timing in response to the synchronization timing of each group being updated based on the updated timing synchronization signal.

20. The method of claim 15, wherein the updated synchronization timing signal is based on at least one of a global positioning system (GPS) timing and a base station timing.

21. A user equipment (UE) for communicating with a wireless network, the UE comprising:
a processor configured to generate an updated timing synchronization signal; and
a transceiver configured to:
discover a first wireless communication device of a first group of synchronized wireless communication devices; and
transmit the updated timing synchronization signal to the first wireless communication device according to a first transmission period,
wherein the first transmission period is shorter than a second transmission period associated with one or more beacons from one or more communication device of the first group of synchronized wireless communication devices, and wherein a synchronization timing of the first group of synchronized wireless communication devices is updated based on the updated timing synchronization signal.

22. The UE of claim 21, wherein the transceiver is further configured to:
   transmit a discovery signal to the first wireless communication device;
   receive a request for the updated timing synchronization signal from the first wireless communication device; and
   transmit the updated timing synchronization signal to the first wireless communication device in response to receiving the request.

23. The UE of claim 21, wherein the transceiver is further configured to:
   transmit the updated timing synchronization signal as part of a beacon of the wireless communication device.

24. The UE of claim 21, wherein the transceiver is further configured to:
   transmit the updated timing synchronization signal as part of a signal transmission that is separate from a beacon of the wireless communication device.

25. The UE of claim 21, wherein the transceiver is further configured to:
   transmit the updated timing synchronization signal to a second wireless communication device of a second group of synchronized wireless communication devices,
   wherein a synchronization timing of the second group of synchronized wireless communication devices is updated based on the updated timing synchronization signal such that the first and second groups of synchronized wireless communication devices have a common synchronization timing in response to the synchronization timing of each group being updated based on the updated timing synchronization signal.

26. The UE of claim 21, wherein the updated synchronization timing signal is based on at least one of a global positioning system (GPS) timing and a base station timing.

* * * * *